United States Patent
Ookubo et al.

(10) Patent No.: US 8,269,018 B2
(45) Date of Patent: Sep. 18, 2012

(54) PYRAZOLOTRIAZOLE COMPOUND AND ELECTROPHOTOGRAPHIC TONER

(75) Inventors: Kimihiko Ookubo, Tokyo (JP); Ryohei Iwamoto, Tokyo (JP); Koji Daifuku, Tokyo (JP); Keiko Ishidai, Tokyo (JP); Kaori Ono, Tokyo (JP); Issei Nakahara, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/192,110

(22) Filed: Jul. 27, 2011

(65) Prior Publication Data

US 2011/0300481 A1     Dec. 8, 2011

Related U.S. Application Data

(63) Continuation of application No. 12/402,232, filed on Mar. 11, 2009, now abandoned.

(30) Foreign Application Priority Data

Mar. 14, 2008 (JP) ................. 2008-065484

(51) Int. Cl.
C07D 249/00 (2006.01)
G03G 9/09 (2006.01)
(52) U.S. Cl. ................. 548/262.2; 430/108.1
(58) Field of Classification Search ............... 548/262.2; 430/108.1
See application file for complete search history.

(56) References Cited

U.S. PATENT DOCUMENTS

| | | | |
|---|---|---|---|
| 7,678,520 B2 | 3/2010 | Daifuku et al. | |
| 2006/0093935 A1 | 5/2006 | Ono et al. | |
| 2006/0257774 A1 | 11/2006 | Daifuku et al. | |
| 2007/0092819 A1 | 4/2007 | Daifuku et al. | |
| 2009/0233207 A1 | 9/2009 | Ookubo et al. | |
| 2009/0291377 A1 | 11/2009 | Hirose et al. | |
| 2009/0291381 A1 | 11/2009 | Hirose et al. | |

FOREIGN PATENT DOCUMENTS

| | | |
|---|---|---|
| JP | 2006350300 | 12/2006 |
| JP | 2008-176176 A | 7/2008 |
| JP | 2008198887 | 8/2008 |

*Primary Examiner* — Hoa V Le
(74) *Attorney, Agent, or Firm* — Lucas & Mercanti, LLP

(57) ABSTRACT

A compound represented by Formula (X-1) is disclosed.

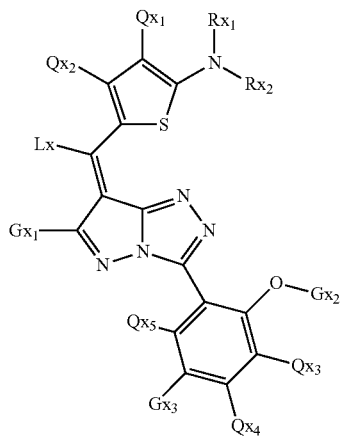

Formula (X-1)

in the formula, $Rx_1$ and $Rx_2$ each independently represents an alkyl group, Lx is a hydrogen atom or an alkyl group, $Gx_1$ is an alkyl group having 2 or more carbon atoms, $Gx_2$ is an alkyl group or an aromatic hydrocarbon group, $Gx_3$ is a hydrogen atom, a halogen atom, a $Gx_4$-CO—NH— group or a $Gx_5$-N($Gx_6$)-CO—group, $Gx_5$ and $Gx_6$ each independently represents a hydrogen atom or a substituent, and $Qx_1$, $Qx_2$, $Qx_3$, $Qx_4$ and $Qx_5$ each independently represents a hydrogen atom or a substituent. An electrophotographic toner containing the compound is also disclosed.

14 Claims, No Drawings

PYRAZOLOTRIAZOLE COMPOUND AND ELECTROPHOTOGRAPHIC TONER

This application is a Continuation of application Ser. No. 12/402,232 filed Mar. 11, 2009 which, in turn, claims the benefit of priority of Japanese Patent Application No. 2008-65484 filed Mar. 14, 2008, in Japanese Patent Office both Applications are incorporated herein by reference.

BACKGROUND OF THE INVENTION

1. Technical Field

The present invention relates to a compound having a specific structure and further an electrophotographic toner containing the compound.

2. Description of Related Art

A substance of an organic compound is known as an organic dye which gives a color to a material by absorption of visible light. The organic dye is widely utilized in various fields such as dying of fabrics, colorant for resin or paint, image forming material for photography, printing, copying apparatus and printer, and light absorbent of color filter by utilizing a function to give a color to a material. Various image forming dyes are proposed for forming color hard copy employing methods such as inkjet, electrophotography, silver salt photography and thermal transfer. Demands of dyes for a filter dye for a camera tube or a liquid crystal color television, a light image recording medium employing semiconductor laser, in accordance to a development of an electronic imaging. Thus the fields utilizing the dye expand recently. The dye is commonly expected to have the following properties.

The properties include good hue for color reproduction, optimum spectroscopic characteristics, image fastness against light, heat, moisture and chemicals, and large molecular absorbancy index.

The dye is usually used as an electrophotographic toner wherein the dye is mixed and dispersed together with a medium such as a binding resin in a color copying machine or a color printer utilizing electrophotography. The dye used for the electrophotographic toner is preferable to have properties mentioned above. The other properties required for the electrophotographic toner are color reproduction, transparency of an image, inhibition or reduction of stain on a fixing roller surface or inside of printer frame, minimized image blur in fixed image, and toners satisfying these properties are disclosed, for example, Patent Documents 1 and 2.

A demand for larger amount production with shorter delivery time is further enhanced since these toners attain the properties mentioned above with high level and are very high performance. Further improvement in dye is required in adaptation of a toner production process in which the used dyes have several insufficient matters.

Patent Document 1: JP A 2006-350300
Patent Document 2: JP A 2007-34264

SUMMARY

The present invention is practiced to dissolve these problems mentioned above. An object of this invention is to provide a compound more adaptable for a toner production process, and another objection is to provide an electrophotographic toner having excellent adaptability to the production process.

The present invention is described.
A compound represented by Formula (X-1).

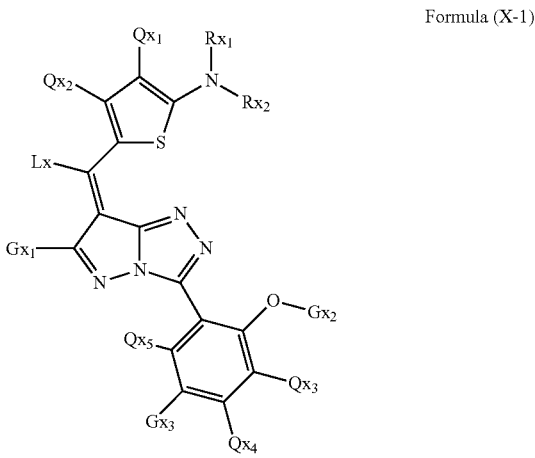

Formula (X-1)

In the formula, $Rx_1$ and $Rx_2$ each independently represent an alkyl group, Lx is a hydrogen atom or an alkyl group, $Gx_1$ is an alkyl group having 2 or more carbon atoms, $Gx_2$ is an alkyl group or an aromatic hydrocarbon group, $Gx_3$ is a hydrogen atom, a halogen atom, a $Gx_4$-CO—NH— group or a $Gx_5$-N($Gx_6$)-CO— group, $Gx_5$ and $Gx_5$ each independently represent a hydrogen atom or a substituent, and $Qx_1$, $Qx_2$, $Qx_3$, $Qx_4$ and $Qx_5$ each independently represent a hydrogen atom or a substituent.

The compound represented by Formula (X-1) is suitably employed for an electrophotographic toner.

A compound more adaptable for a toner production process is provided. An electrophotographic toner having excellent adaptability to the production process is provided by the present invention.

The compound represented by Formula X-1 is described below.

In the formula, $Rx_1$ and $Rx_2$ are each independently an alkyl group which may be a straight-chain alkyl group, a branched-chain alkyl group or a cycloalkyl group, and the alkyl groups represented by $Rx_1$ or $Rx_2$ may be the same or different. In concrete, examples of the straight- and branched-chain alkyl group include a methyl group, an ethyl group, a propyl group, an isopropyl group, an n-butyl group, an isobutyl group, a tert-butyl group, a pentyl group, an amyl group, an isoamyl group, a hexyl group, an octyl group, a dodecyl group, a tridecyl group, a tetradecyl group and a pentadecyl group, and those of the cycloalkyl group include a cyclopropyl group, a cyclobutyl group, a cyclopentyl group, a cyclohexyl group and a 4-tert-butyl-cyclohexyl group. The straight-chain alkyl groups and the branched-chain alkyl groups are preferred.

The alkyls group represented by $Rx_1$ or $Rx_2$ each may have a substituent. The group substitutable on the alkyl group is not specifically limited and examples of that include the above described alkyl groups and cycloalkyl groups; an alkenyl group such as a vinyl group and an allyl group; an alkynyl group such as a ethynyl group and a propargyl group; an aromatic hydrocarbon group such as a phenyl group and a naphthyl group; an aromatic heterocyclic group such as a furyl group, a thienyl group, a pyridyl group, a pyridazyl group, a pyrimidyl group, a pyrazyl group, a triazyl group, an imidazolyl group, a pyrazolyl group, a thiazolyl group, a benzimidazolyl group, a benzoxyazolyl group, a quinazolyl group and a phthalazyl group, a heterocyclic group such as a pyrrolidinyl group, an imidazolidinyl group, a morpholyl group and an oxazolidinyl; an alkoxyl group such as a methoxy group, an ethoxy group, a propyloxy group, a pentyloxy group, a hexyloxy group, an octyloxy group and a dodecyloxy group; a cycloalkoxyl group such as a cyclopentyloxy group and a cyclohexyloxy group; an aryloxyl group such as a phenoxy group and a naphthyloxy group; an alkylthio group such as a methylthio group, an ethylthio group, a propylthio group, a pentylthio group, a hexylthio group, an octylthio group and a dodecylthio group; a cycloalkylthio group such as a cyclopentylthio group and a cyclohexylthio group; an arylthio group such as a phenylthio group and a naphthylthio group; an alkoxycarbonyl group such as a methyloxycarbonyl group; an ethyloxycarbonyl group, a butyloxycarbonyl group, an octyloxycarbonyl group and a dodecyloxycarbonyl group; an aryloxycarbonyl group such as a phenyloxycarbonyl group and a naphthyloxycarbonyl group; a phosphoryl such as a dimethoxyphosphoryl group and a diphenylphosphoryl group; a sulfamoyl group such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group; an acyl group such as an acetyl group, an ethylcarbonyl group, a propylcarbonyl group, a pentylcarbonyl group, a cyclohexylcarbonyl group, an octylcarbonyl group, a 2-ethylhexylcarbonyl group, a dodecylcarbonyl group, a phenylcarbonyl group, a naphthylcarbonyl group and a pyridylcarbonyl group; an acyloxy group such as an acetyloxy group, an ethylcarbonyloxy group, a butylcarbonyloxy group, an octylcarbonyloxy group, a dodecylcarbonyloxy group and a phenylcarbonyloxy group; an amido group such as a methylcarbonylamino group, an ethylcarbonylamino group, a dimethylcarbonylamino group, a propylcarbonylamino group, a pentylcarbonylamino group, a cyclohexylcarbonylamino group, 2-ethylhexylcarbonylamino group, an octylcarbonylamino group, a dodecylcarbonylamino group, a phenylcarbonylamino group and a naphthylcarbonylamino group; a carbamoyl group such as an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group and a 2-pyridylamino-carbonyl group; a ureido group such as a methylureido group, an ethylureido group, a pentylureido group, a cyclohexylureido group, an octylureido group, a dodecylureido group, a phenylureido group, a naphthylureido group and a 2-pyridylureido group; a sulfinyl group such as a methylsulfinyl group, an ethylsulfinyl group, a butylsulfinyl group, a cyclohexylsulfinyl group, a 2-ethylhexylsulfinyl group, a dodecylsulfinyl group, a phenylsulfinyl group, a naphthylsulfinyl group and a 2-pyridylsulfinyl group; an alkylsulfonyl group such as a methylsulfonyl group, an ethylsulfonyl group, a butylsulfonyl group, a cyclohexylsulfonyl group, a 2-ethylhexylsulfonyl group and a dodecylsulfonyl group; an arylsulfonyl group such as a phenylsulfonyl group, a naphthylsulfonyl group and a 2-pyridylsulfonyl group; an amino group such as an amino group, an ethylamino group; a dimethylamino group, a butylamino group, a dibutylamino group, a cyclopentylamino group, a 2-ethylhexylamino group, a dodecylamino group, an anilino group, a naphthylamino group and a 2-pyridylamino group; an azo group such as a phenylazo group; an alkylsulfonyloxy group such as a methanesulfonyloxy group; a cyano group; a nitro group; a halogen atom such as a fluorine atom, a chlorine atom and a bromine atom, and a hydroxyl group.

These groups each may further have a substituent. Preferable examples of the substituent capable of substituting on the alkyl group represented by $Rx_1$ or $Rx_2$ are the aromatic hydrocarbon group, alkoxyl group, cycloalkyl group, halogen atom and hydroxyl group.

As the alkyl group represented by $Rx_1$ or $Rx_2$, unsubstituted alkyl groups and those substituted by the alkoxyl group are preferable and the unsubstituted alkyl groups are most preferable.

The total number of carbon atoms contained in the alkyl group represented by $Rx_1$ and $Rx_2$ is preferably not less than 8 and more preferably not less than 12 and most preferably not less than 16.

Lx is a hydrogen atom or an alkyl group, and preferably a hydrogen atom. When Lx is an alkyl group, the alkyl group is synonym for the alkyl group represented by $Rx_1$ or $Rx_2$ and is preferably an alkyl group having 1 to 5 carbon atoms and more preferably a methyl group or an ethyl group.

$Gx_1$ represents an alkyl group having 2 or more carbon atoms, and the alkyl group may be any of a straight-chain alkyl group, a branched-chain alkyl group and a cycloalkyl group. Concrete examples of the straight- and branched-chain alkyl group include an ethyl group, a propyl group, an isopropyl group, an n-butyl group, an isobutyl group, a text-butyl group, a pentyl group, an amyl group, an isoamyl group, a hexyl group, an octyl group, a dodecyl group, a tridecyl group, a tetradecyl group and a pentadecyl group, and those of the cycloalkyl group include a cyclopropyl group, a cyclobutyl group, a cyclopentyl group, a cyclohexyl group and a 4-tert-butyl-cyclohexyl group. Among them, the branched-alkyl groups are preferable and the tertiary alkyl group is more preferable and the tert-butyl group is most preferable.

$Gx_2$ is an alkyl group or an aromatic hydrocarbon group, the alkyl group is synonym for the alkyl group represented by $Rx_1$ and $Rx_2$ and the aromatic hydrocarbon group is, for example, a phenyl group or a naphthyl group, and is preferably the alkyl group, more preferably the alkyl group having 1 to 5 carbon atoms and further preferably a methyl group or an ethyl group.

$Gx_3$ is a halogen atom, a $Gx_4$-CO—NH— group or a $Gx_3$-N($Gx_6$)-CO— group and preferably a hydrogen atom. $Gx_4$ each represents a substituent. As the substituent, a group synonym for the substituent capable of substituting on the alkyl group represented by $Rx_1$ and $Rx_2$, and preferably a group synonym for the alkyl group represented by $Rx_1$ or $Rx_2$ or an aromatic hydrocarbon group.

$Gx_5$ and $Gx_6$ are each a hydrogen atom or a substituent. As the substituent, groups synonym for the group capable of substituting with the alkyl group represented by $Rx_1$ or $Rx_2$ are cited, and the alkyl groups synonym for the alkyl groups represented by $Rx_1$ or $Rx_2$ are preferable.

$Qx_1$, $Qx_2$, $Qx_3$, $Qx_4$, $Qx_5$ and $Qx_6$ are each independently a hydrogen atom or a substituent, and the groups synonym for the groups represented by $Gx_1$ can be cited as the substituent. It is preferable that $Qx_1$, $Qx_2$, $Qx_3$, $Qx_4$, $Qx_5$ and $Qx_5$ are each independently a hydrogen atom, an alkyl group, halogen atom or an alkoxyl group and is most preferable that they are hydrogen atoms.

Concrete examples of the compound represented by Formula X-1 are shown below. Isomers are included when they exist.

DX-1 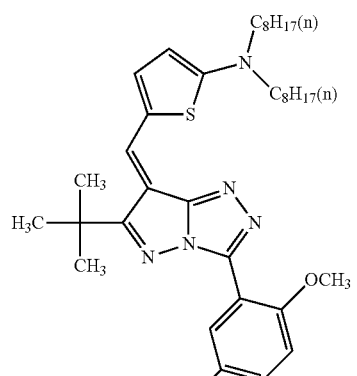
DX-2
DX-3 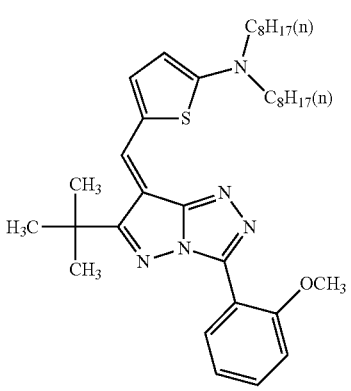
DX-4
DX-5 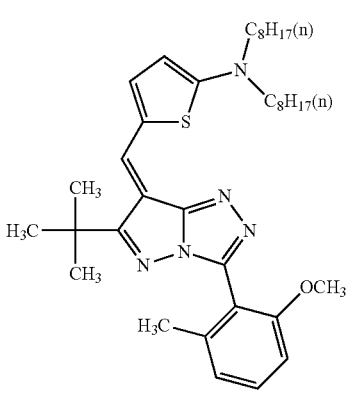
DX-6
DX-7 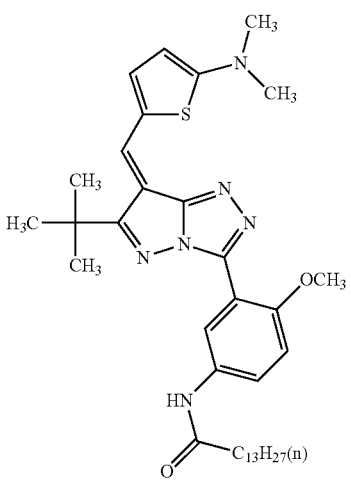

DX-8
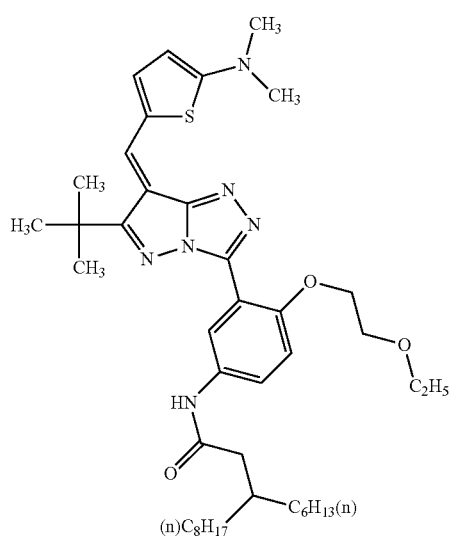
DX-9
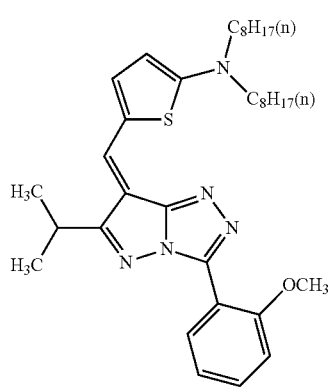
DX-10
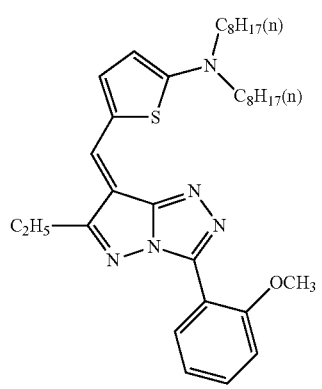
DX-11
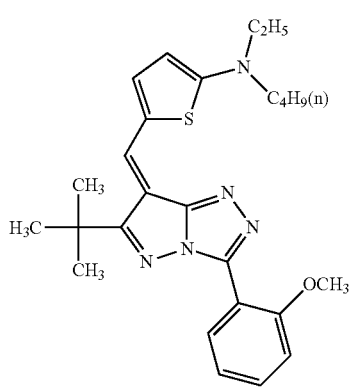
DX-12
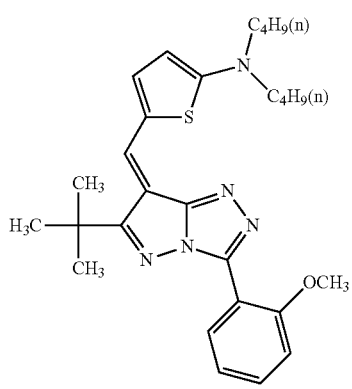
DX-13
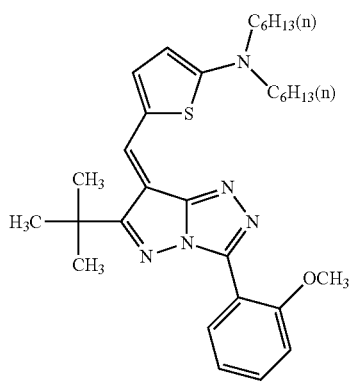
DX-14
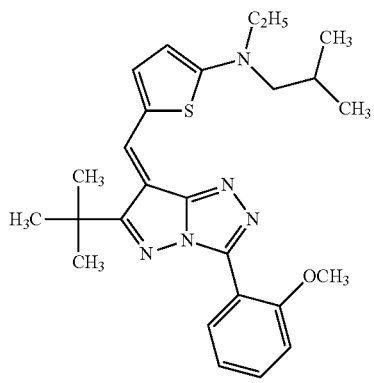

-continued
DX-15
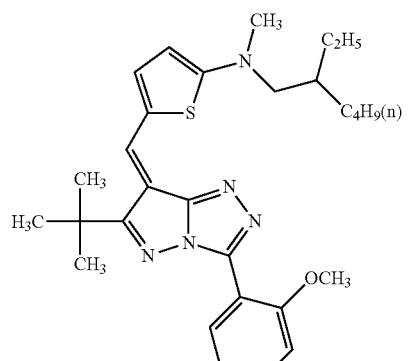
DX-16
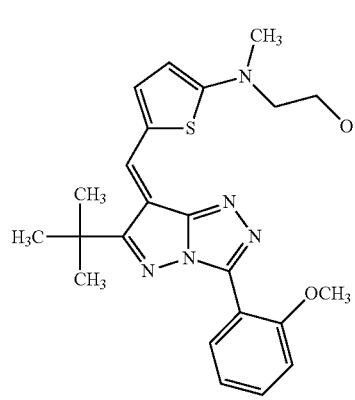
DX-17
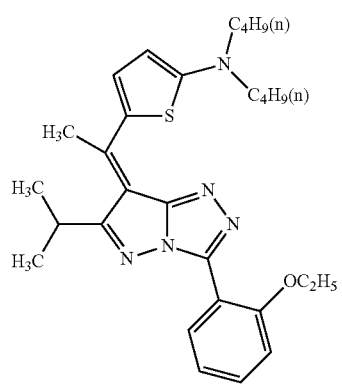
DX-18
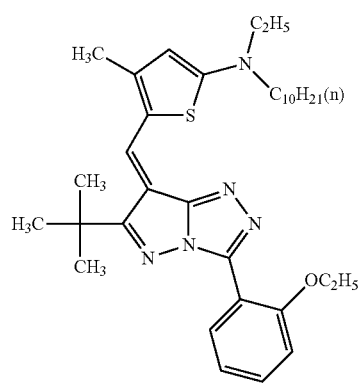
-continued
DX-19
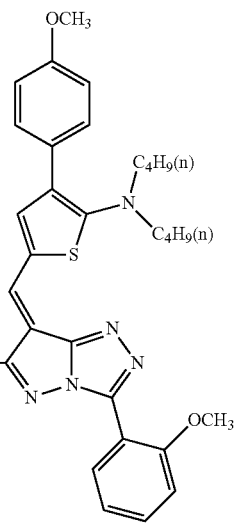
DX-20
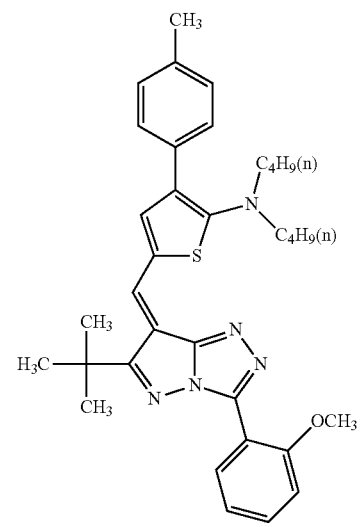
DX-21
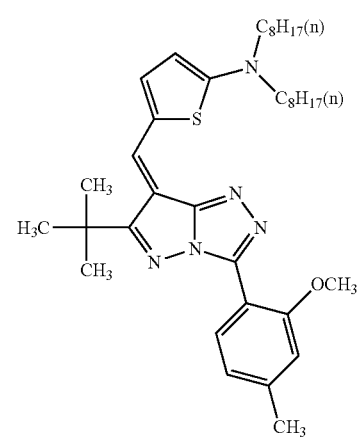

SYNTHESIS EXAMPLE 1

Synthesis of Exemplified Compound DX-1

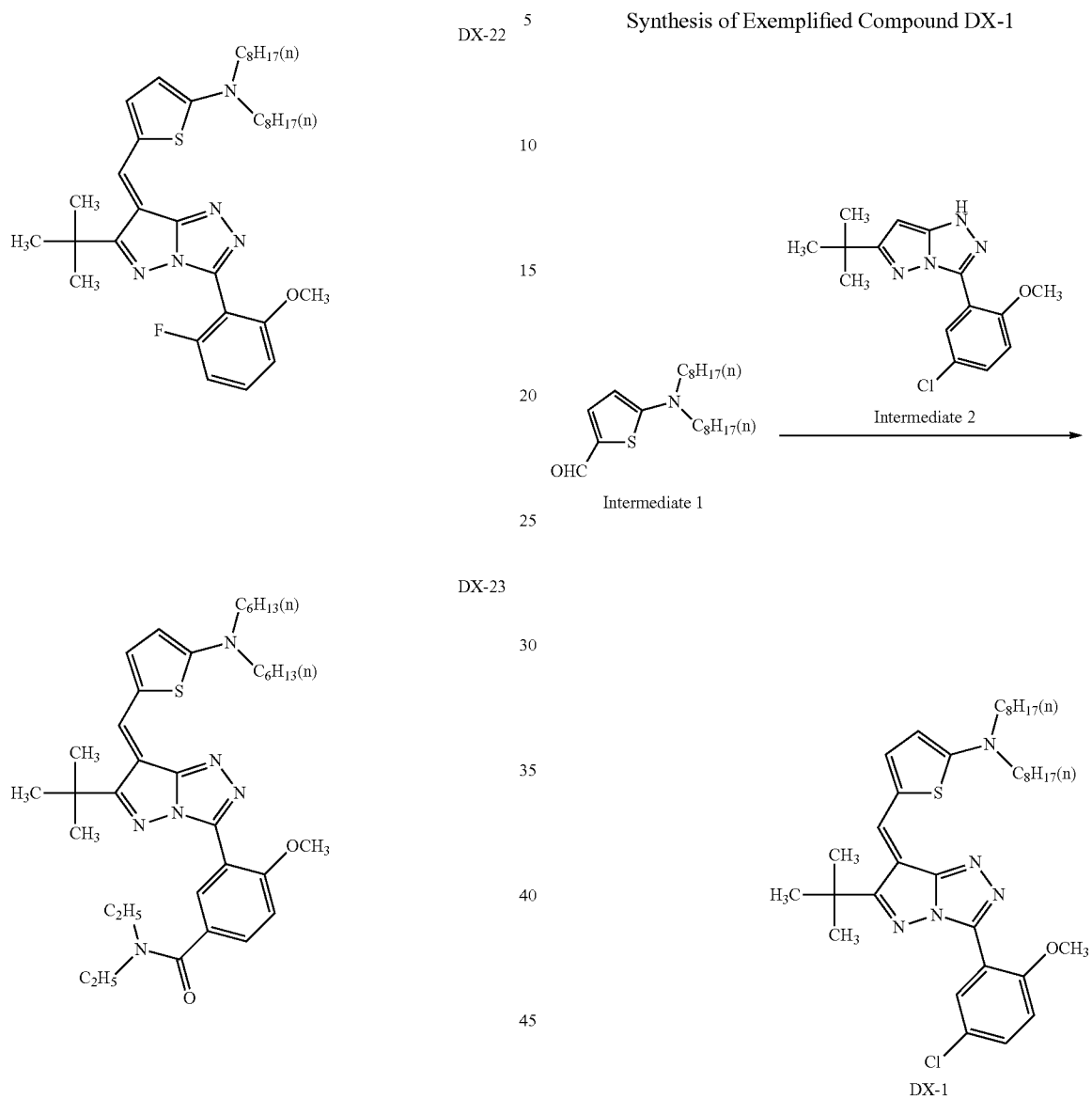

The compound represented by formula (X-1) can be synthesized by methods described, for example, following documents; JP A S63-226653, JP A H10-193807, JP A H 11-78258, JP A H 6-250357, JP A H 2-155593, JP A H01-110565, JP A H02-668, JP A H02-28264, JP A H02-53865, JP A H02-53866, British Patent 1,252,418, JP A S64-63194, JP A H02-208094, JP A H03-205189, JP A H 02-265791, JP A H02-310087, JP A H02-53866, JP A H04-91987, JP A S63-205288, JP A H03-226750, British Patent 1,183,515, JP A H04-190348, JP A S63-113077, JP A H03-275767, JP A H04-13774, JP A H04-89287, JP A H07-175187, JP A H10-60296, JP A H11-78258, JP A 2004-138834, and JP A 2006-350300.

Synthesis examples of the compounds represented by formula (X-1) are described, and the other compounds may be synthesized by a similar synthesis method. These can be synthesized by other way.

Fifty milliliter of toluene and 0.35 g of morpholine were added to 1.93 g of Intermediate 1 and 1.53 g of Intermediate 2 while stirring and heated and refluxed to make reaction for 8 hours while dehydrating by using an esterifying tube. After finishing of the reaction, the reacting liquid was concentrated and purified by column chromatography and recrystallized from the ethyl acetate/hexane mixed solvent to obtain 2.71 g of DX-1. It was confirmed by NABS, $^1$H-NMR and IR spectrum that the obtained material was the objective substance. The maximum absorption wavelength in visible light absorption spectrum (solvent: ethyl acetate) was 535 nm and the mole absorbancy index was 71,000 (L/mole·cm).

SYNTHESIS EXAMPLE 2

Synthesis of Exemplified Compound DX-2

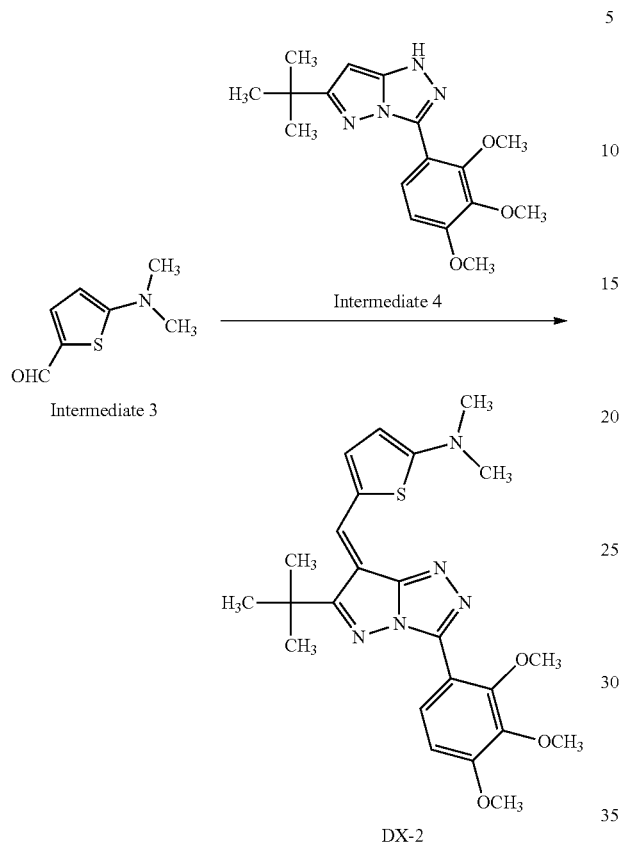

Exemplified Compound DX-2 was obtained in the same manner as in Synthesis Example 1 except that Intermediate 1 was replaced by Intermediate 3 and Intermediate 2 was replaced by Intermediate 4, and recrystallization solvent was replaced by methanol. The maximum absorption wavelength in visible light absorption spectrum (solvent: ethyl acetate) was 522 nm and the mole absorbancy index was 53,000 (L/mole·cm).

SYNTHESIS EXAMPLE 3

Synthesis of Exemplified Compound DX-3

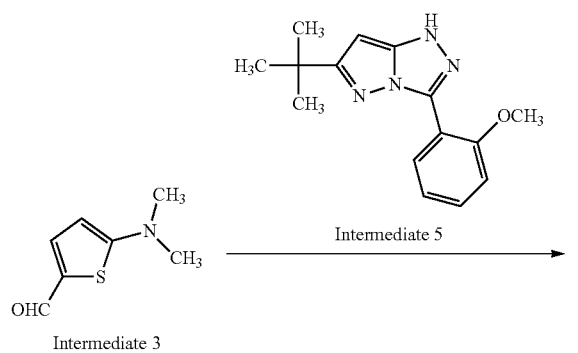

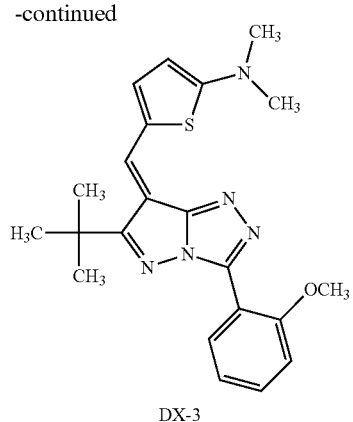

DX-3

Exemplified Compound DX-2 was obtained in the same manner as in Synthesis Example 2 except that Intermediate 4 was replaced by Intermediate 5. The maximum absorption wavelength in visible light absorption spectrum (solvent: ethyl acetate) was 544 nm and the mole absorbancy index was 56,000 (L/mole·cm).

SYNTHESIS EXAMPLE 4

Synthesis of Exemplified Compound DX-4

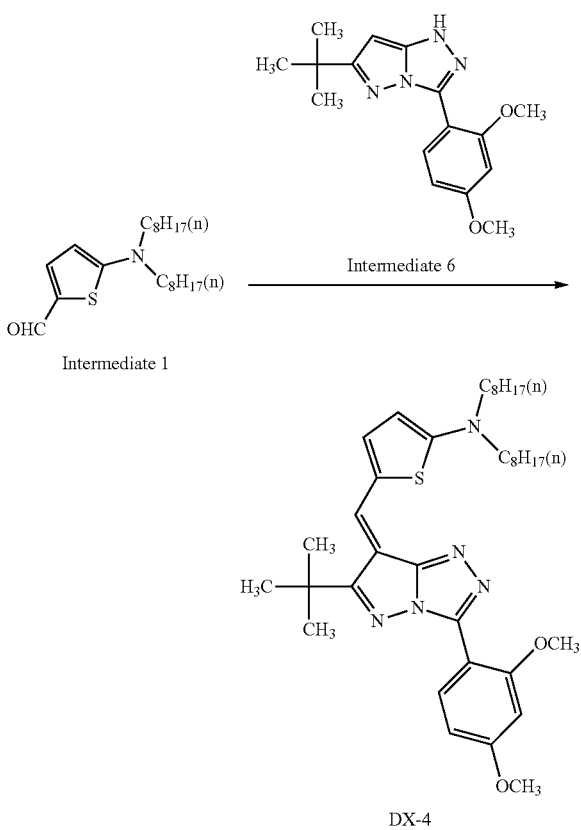

Exemplified Compound DX-4 was obtained in the same manner as in Synthesis Example 1 except that Intermediate 2 was replaced by Intermediate 6. The maximum absorption wavelength in visible light absorption spectrum (solvent: ethyl acetate) was 532 nm and the mole absorbancy index was 60,000 (L/mole·cm).

SYNTHESIS EXAMPLE 5

Synthesis of Exemplified Compound DX-5

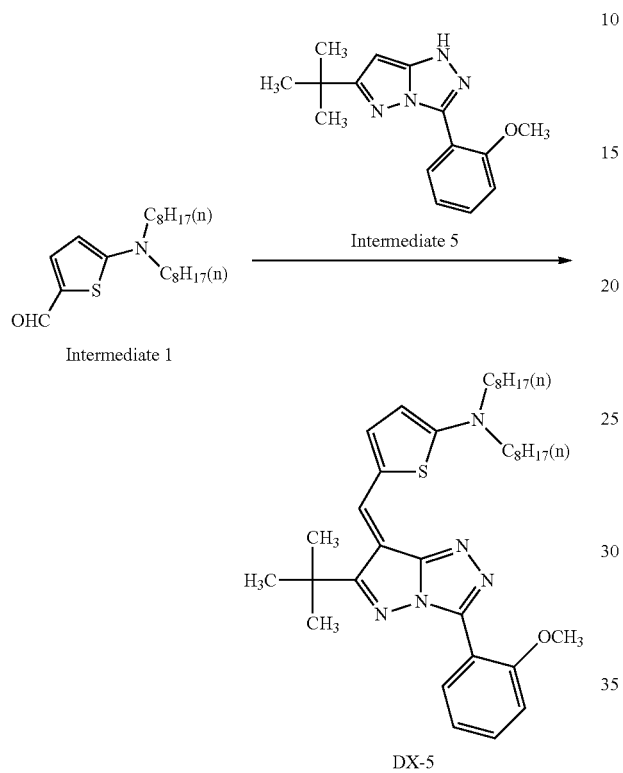

DX-5

Exemplified Compound DX-5 having a melting point of from 96.5 to 97.5° C. was obtained in the same manner as in Synthesis Example 1 except that Intermediate 2 was replaced by Intermediate 5 used in the Synthesis Example 3. The maximum absorption wavelength in visible light absorption spectrum (solvent: ethyl acetate) was 533 nm and the mole absorbancy index was 56,600 (L/mole·cm).

SYNTHESIS EXAMPLE 6

Synthesis of Exemplified Compound DX-6

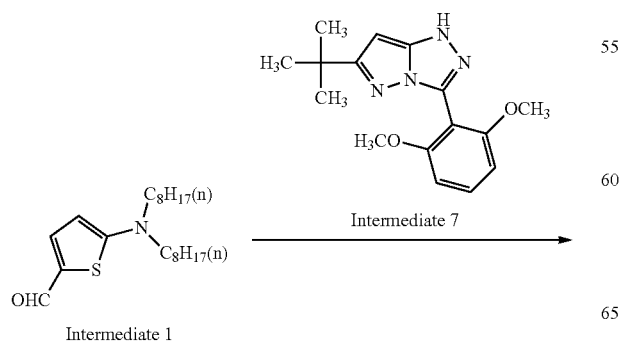

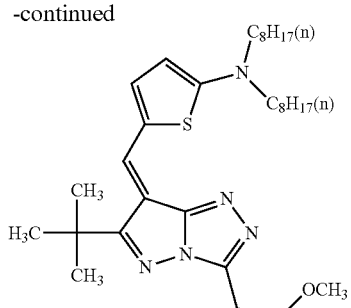

DX-6

Exemplified Compound DX-6 was obtained in the same manner as in Synthesis Example 1 except that Intermediate 2 was replaced by Intermediate 7. The maximum absorption wavelength in visible light absorption spectrum (solvent: ethyl acetate) was 526 μm and the mole absorbancy index was 61,000 (L/mole·cm).

SYNTHESIS EXAMPLE 7

Synthesis of Exemplified Compound DX-7

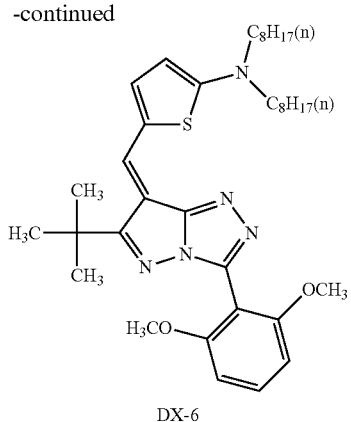

DX-7

Exemplified compound DX-7 was obtained in the same manner as in Synthesis Example 2 except that Intermediate 4 was replaced by Intermediate 7 and recrystallization solvent was replaced by mixture of ethylacetate and hexane. The maximum absorption wavelength in visible light absorption spectrum (solvent: ethyl acetate) was 523 nm and the mole absorbancy index was 56,000 (L/mole·cm).

SYNTHESIS EXAMPLE 8

Synthesis of Exemplified Compound DX-9

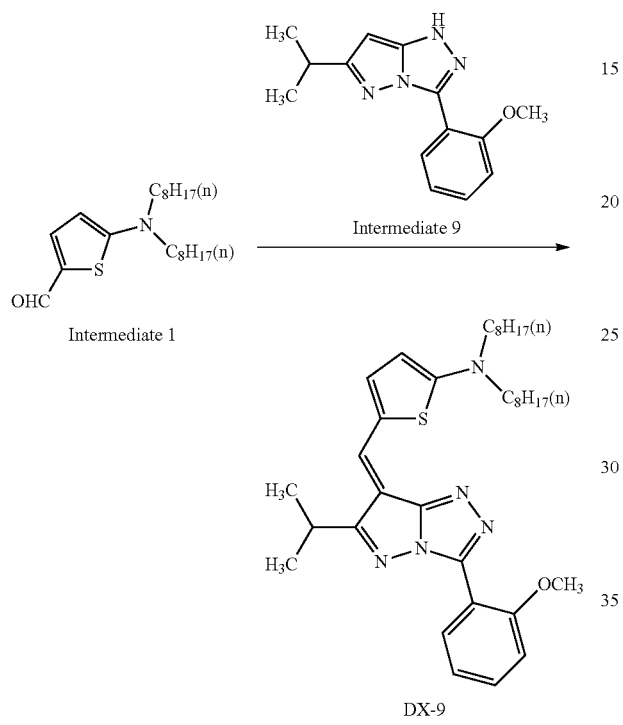

DX-9

Exemplified Compound DX-9 was obtained in the same manner as in Synthesis Example 1 except that Intermediate 1 was replaced by Intermediate 9. The maximum absorption wavelength in visible light absorption spectrum (solvent: ethyl acetate) was 533 nm.

SYNTHESIS EXAMPLE 9

Synthesis of Exemplified Compound DX-10

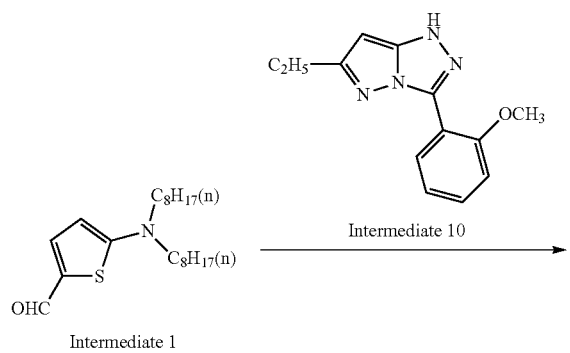

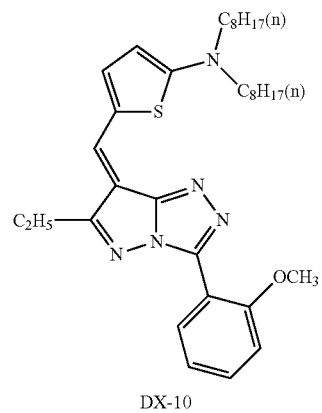

DX-10

Exemplified Compound DX-10 was obtained in the same manner as in Synthesis Example 1 except that Intermediate 1 was replaced by Intermediate 10. The maximum absorption wavelength in visible light absorption spectrum (solvent: ethyl acetate) was 532 nm.

The color toner for an electrophotography of this invention is preferably to further comprise a compound represented by Formula (1).

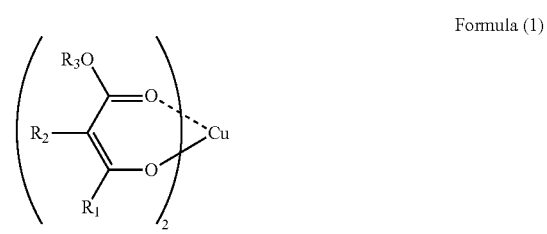

Formula (1)

$R_1$ is a hydrogen atom or a substituent, $R_2$ is an alky group, an alkenyl group, an alkynyl group, an aryl group, a heterocyclic group, an alkoxycarbonyl group, an aryloxycarbonyl group, a sulfamoyl group, a sulfinyl group, an alkylsulfonyl group, an arylsulfonyl group and a cyano group, in which at least one of $R_1$ and $R_2$ is an electron attractive group, and $R_3$ is an alky group having 3 or more carbon atoms, an alkenyl group, or an alkynyl group, an aryl group or a heterocyclic group, with proviso that number of carbon atoms in one molecule of the ligand represented by formula (1) is 25 or less.

Metal containing compounds represented by formula (1) will be described.

Metal containing compounds represented by formula (1) are preferably those obtained by reacting the compounds represented by formula (1) after their synthesis with a divalent copper compound. The metal containing organic compound can be synthesized in accordance of the description of "Chelate Chemistry (5) Complex Chemistry Experiment Method [1], Nankodo edition" or so. The divalent cupric compounds are copper chloride, and cupric acetate, and cupric acetate is preferably employed.

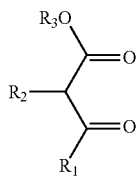

Formula (2)

The metal containing compounds may have a neutral ligand if necessary, representative example of which includes $H_2O$ and $NH_3$.

$R_1$ is a hydrogen atom or a substituent in formula (1). The substituent includes an alley group such as a methyl group, an ethyl group, a propyl group, an isopropyl group, a tert-butyl group, a pentyl group, a hexyl group, an octyl group, a dodecyl group, a tridecyl group, a tetradecyl group and a pentadecyl group, a chloromethyl group, a trifluoromethyl group, a tribromomethyl group, a pentafluoroethyl group, and a methoxyethyl group; a cycloalkyl group such as a cyclopentyl group and a cyclohexyl group; an alkenyl group such as a vinyl group and an allyl group; an alkynyl group such as an ethynyl group and a propargyl group; an aryl group such as a phenyl group, a naphthyl group, a p-nitrophenyl group, a p-fluorophenyl group, and a p-methoxy phenyl group; a heterocyclic group such as a furyl group, a thienyl group, a pyridyl group, pyridazyl group, pyrimidyl group, a pyrazyl group, a triazyl group, an imidazolyl group, a pyrazolyl group, a thiazolyl group, a benzimidazolyl group, a benzoxazolyl group, a quinazolyl group, a phthalazyl group, a pyrrolidinyl group, an imidazolidinyl group, a morpholyl group, and an oxazolidinyl group; an alkoxycarbonyl group such as a methyloxycarbonyl group, an ethyloxycarbonyl group, a butyloxycarbonyl group, an octyloxycarbonyl group and a dodecyloxycarbonyl group; an aryloxycarbonyl group such as a phenyloxycarbonyl group and a naphthyloxycarbonyl group; a sulfamoyl group such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group; an acyl group such as an acetyl group, an ethylcarbonyl group, a propylcarbonyl group, a pentylcarbonyl group, a cyclohexylcarbonyl group, an octylcarbonyl group, a 2-ethylheaxylcarbonyl group, a dodecylcarbonyl group, a phenylcarbonyl group, a naphthylcarbonyl group and a pyridylcarbonyl group; a carbamoyl group such as an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group and a 2-pyridylaminocarbonyl group; a sulfinyl group such as a methylsulfinyl group, an ethylsulfinyl group, a butylsulfinyl group, a cyclohexylsulfinyl group, a 2-ethylhexylsulfinyl group, a dodecylsulfinyl group, a phenylsulfinyl group, a naphthylsulfinyl group and a 2-pyridylsulfinyl group; an alkylsulfonyl group such as a methylsulfonyl group, an ethylsulfonyl group, a butylsulfonyl group, a cyclohexylsulfonyl group, a 2-ethylhexylsulfonyl group and a dodecylsulfonyl group; an arylsulfonyl group such as a phenylsulfonyl group, a naphthylsulfonyl group and 2-pyridylsulfonyl group; and a cyano group.

Preferable example of $R_1$ is an alky group, an alkenyl group, an aryl group, a heterocyclic group, an alkoxycarbonyl group, an acyl group, a carbamoyl group and a cyano group. An alky group, an aryl group, a heterocyclic group and a cyano group are more preferable.

The substituent may be substituted by other substituent.

An alky group is most preferable and a trifluoromethyl group and a trichloromethyl group are preferable.

$R_2$ is an alky group, an alkenyl group, an alkynyl group, an aryl group, a heterocyclic group, an alkoxycarbonyl group, an aryloxycarbonyl group, a sulfamoyl group, a sulfinyl group, a sulfonyl group and a cyano group.

Practically, example of $R_2$ includes an alky group such as a methyl group, an ethyl group, a propyl group, an isopropyl group, a tert-butyl group, a pentyl group, a hexyl group, an octyl group, a dodecyl group, a tridecyl group, a tetradecyl group, a pentadecyl group, a chloromethyl group, a trifluoromethyl group, a tribromomethyl group, a pentafluoroethyl group, and a methoxyethyl group; an alkenyl group such as a vinyl group and an allyl group; an alkynyl group such as an ethynyl group and a propargyl group; an aryl group such as a phenyl group, a naphthyl group, a p-nitrophenyl group, a p-fluorophenyl group, and a p-methoxy phenyl group; a heterocyclic group such as a furyl group, a thienyl group, a pyridyl group, pyridazyl group, pyrimidyl group, a pyrazyl group, a triazyl group, an imidazolyl group, a pyrazolyl group, a thiazolyl group, a benzimidazolyl group, a benzoxazolyl group, a quinazolyl group, a phthalazyl group, a pyrrolidinyl group, an imidazolidinyl group, a morpholyl group, and an oxazolidinyl group; an alkoxycarbonyl group such as a methyloxycarbonyl group, an ethyloxycarbonyl group, a butyloxycarbonyl group, an octyloxycarbonyl group and a dodecyloxycarbonyl group; an aryloxycarbonyl group such as a phenyloxycarbonyl group and a naphthyloxycarbonyl group; a sulfamoyl group such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group; a sulfinyl group such as a methylsulfinyl group, an ethylsulfinyl group, a butylsulfinyl group, a cyclohexylsulfinyl group, a 2-ethylhexylsulfinyl group, a dodecylsulfinyl group, a phenylsulfinyl group, a naphthylsulfinyl group and a 2-pyridylsulfinyl group; and an alkylsulfonyl group such as a methylsulfonyl group, an ethylsulfonyl group, a butylsulfonyl group, a cyclohexylsulfonyl group, a 2-ethylhexylsulfonyl group and a dodecylsulfonyl group, and an alkylsulfonyl group such as a phenylsulfonyl group, a naphthylsulfonyl group and 2-pyridylsulfonyl group.

a cycloalkyl group such as a cyclopentyl group and a cyclohexyl group;

Preferable example of $R_2$ is an alky group, a cyano group, a sulfinyl group, and sulfonyl group, and further preferably, is a cyano group, a sulfinyl group and a sulfonyl group.

The substituent may be substituted by other substituent.

$R_3$ is an alky group having 3 or more carbon atoms, an alkenyl group, or an alkynyl group, an aryl group or a heterocyclic group. A good stability against water of the compound of (X-1) and the compound of (1) is obtained when $R_3$ has 3 or more carbon atoms. It is remarkably displayed when $R_3$ is an alley group having 8 or more carbon atoms.

The alkyl group having 3 or more carbon atoms includes, for example, propyl, isopropyl, tert-butyl, pentyl, hexyl, octyl, dodecyl, tridecyl, tetradecyl, pentadecyl; the alkenyl group includes, for example, vinyl and allyl; the alkynyl group includes, for example, ethynyl and propargyl; the aryl group includes, for example, phenyl, naphthyl, p-nitrophenyl, p-fluorophenyl and p-methoxyphenyl; the heterocyclic group includes, for example, furyl, thienyl, pyridyl, pyridazyl, pyrimidyl, pyrazyl, triazyl, imidazolyl, pyrazolyl, thiazolyl, benzimidazolyl, benzoxazolyl, quinazolyl, phthalazyl, pyrrolidyl, imidazolidyl, morpholyl and oxazolidyl.

Those alkyl group having 3 or more carbon atoms, alkenyl group, alkynyl group and aryl group may be substituted by a substituent. $R_3$ is preferably an alkyl group having 3 or more carbon atoms or an aryl group.

$R_1$ and $R_2$ or $R_2$ and $R_3$ may combine with each other to form a 5- or 6-membered ring.

The number of carbon atoms in one molecule of the ligand represented by formula (1) is 25 or less. Good affinity and compatibility of the metal containing compound represented by formula (1) to the compound of (X-1) are obtained.

One of the $R_1$ and $R_2$ is an electron-attractive group, and both of $R_1$ and $R_2$ is preferably an electron-attractive group, and the total of σp values of $R_1$ and $R_2$ is 0.2 to 2.0.

The electron attractive group is a substituent which may have positive Hammett substituent constant σ.

When, in m- or p-substituted aromatic compounds, $k_0$ and k are respectively defined as reaction rate constants of an unsubstituted compound and a substituted one, the Hammett substituent constant is defined by the following Hammett equation:

$$\log(k/k_0) = \rho\sigma$$

where σ is a substituent constant; and ρ is a reaction constant. In the foregoing Hammett equation, the dissociation reaction of benzoic acid and its derivatives in an aqueous solution at 25° C. is defined as ρ=1.

Hammett substituent constants are referred to Journal of medicinal Chemistry, 1973, Vol. 16, No. 11, 1207-1216.

Specific examples of an electron-attractive group include a substituted alkyl group such as halogen-substituted alkyl; a substituted alkenyl group such as cyanovinyl; a substituted or unsubstituted alkynyl group such as trifluoromethylacetylenyl, cyanoacetylenyl; a substituted aryl group such as cyanophenyl; a substituted or unsubstituted heterocyclic group such as pyridyl, triazinyl, benzoxazolyl; a halogen atom, cyano group, an acyl group such as acetyl, trifluoroacetyl, formyl; a thioacetyl group such as thioacetyl, thioformyl; an oxalyl such as methyloxalyl; an oxyoxalyl group such as ethoxalyl; a thiooxalyl group such as ethylthiooxalyl; an oxamoyl group such as methyloxamoyl; an oxycarbonyl group such as ethoxycarbonyl; a carboxyl group; a thiocarbonyl group such as ethylthiocarbonyl; a carbamoyl group; a thiocarbamoyl group; a sulfonyl group; a sulfinyl group; an oxysulfonyl group such as ethoxysulfonyl; a thiosulfonyl group such as ethylthiosulfonyl; a sulfamoyl group; an oxysulfinyl group such as methoxysulfinyl; a thiosufinyl group such as methylthiosulfinyl; a sulfinamoyl group; a phosphoryl group; a nitro group; an imino group; an N-carbonylimino group such as N-acetylimino; an N-sulfonylimino group such as N-methanesulfonylimino; a dicyanoethylene group; an ammonium group; a sulfonium group; a phosphonium group; a pyrilium group and an immonium group.

Of the foregoing groups, a substituted alkyl group, a substituted aryl group, a cyano group, an acyl group, an oxycarbonyl group, a nitro group and a cyano group are preferred. Practical examples thereof include a cyano group, a nitro group, a trichloromethyl group, a dichloromethyl group, a chloromethyl group, a tribromomethyl group, a dibromomethyl group, a bromomethyl group, an alkoxyacyl group, an acyl group and an aromatic group substituted by these substituent mentioned above.

It is preferable that log P of one molecule of ligands in the compound represented by Formula (1) is 3 to 8. In this instance an interaction between the compound represented by Formula (1) and the compound represented by Formula (X-1) is sufficiently active, and excellent stability against heat, light and particularly water is obtained absorption is sharp with less subsidiary absorption and further good solubility in an organic solvent is obtained.

The log P is a parameter expressing degree of the hydrophilicity-hydrophobicity of the compound and higher value corresponds to higher hydrophobicity and lower value corresponds to higher hydrophilicity. The log P value is well known parameter of compound and can be obtained by measurement or calculation.

The value of log P calculated by the following expression is different a little from the value determined by measurement in some cases. However, the difference is not so large and approximate property of the compound can be sufficiently surmised by measurement or calculation. The log P value is preferably determined by the calculation when the value can be determined by each of the methods.

$$\log P_{o/w}$$

$$P_{o/w} = S_o/S_w$$

$S_o$=Solubility of the organic compound in n-octanol at 25° C.

$S_w$=Solubility of the organic compound in purified water at 25° C.

For determining the log P value by calculation, some methods such as a method based on molecular orbital calculation, a fragment method basically utilizing data of Hansch and a method by HPLC are applicable. In the invention, the calculation is preferably carried out by using Project Leader contained in a molecular calculation package CAChe manufactured by Fujitsu or ChemProp contained in a chemical structure drawing software CS Chem Draw 8.0 manufactured by Cambridge Soft, and the calculation by ChemProp in CS Chem. Draw 8.0 or its later version is particularly preferable.

Practical examples of the compound represented by Formula (1) are listed.

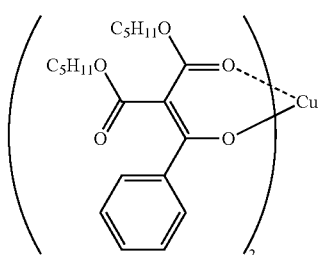

1

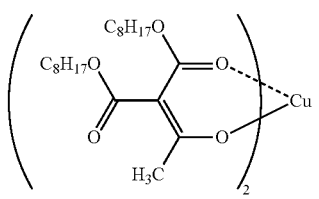

2

3
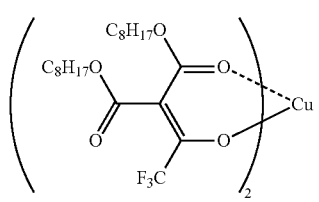
4
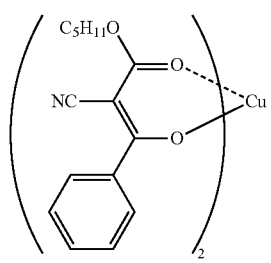
5
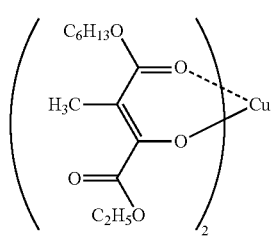
6
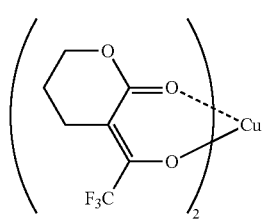
7
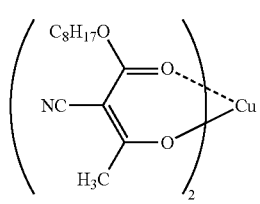
8
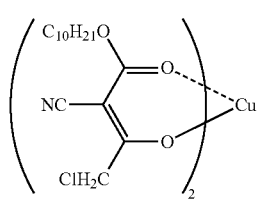
9
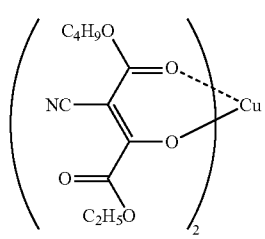
10
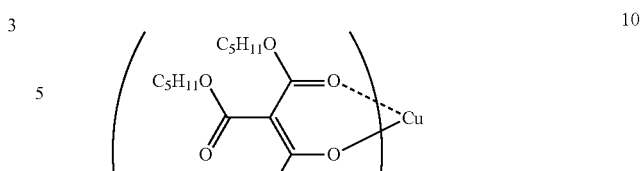
11
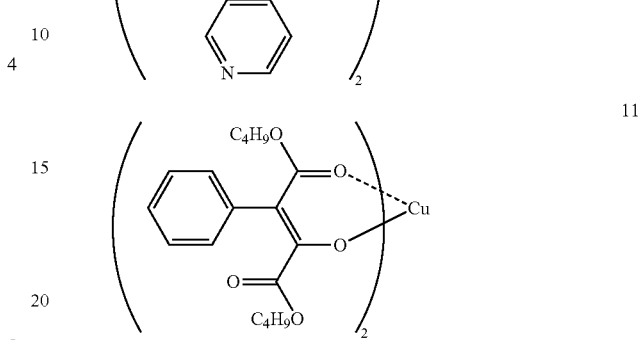
12
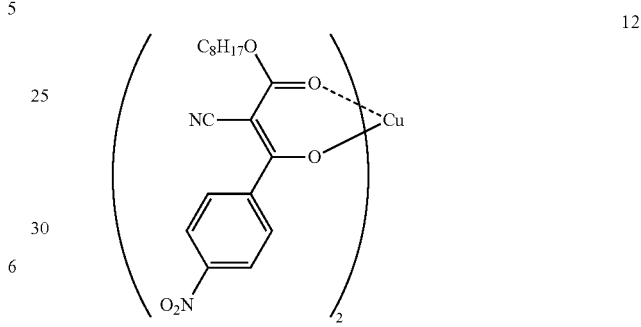
13
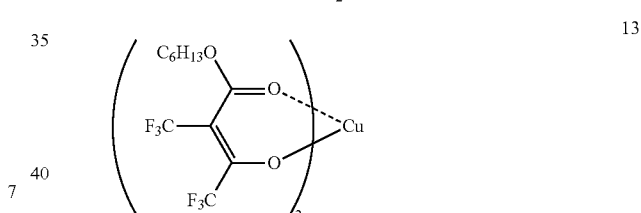
14
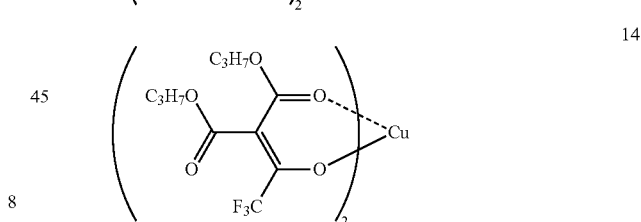
15
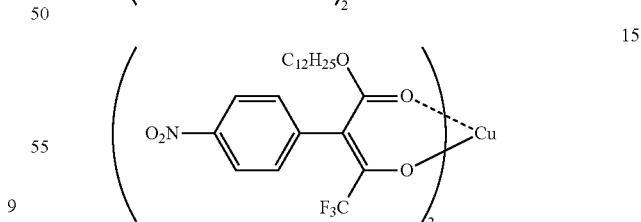
16
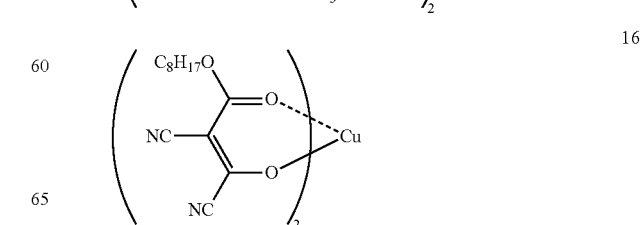

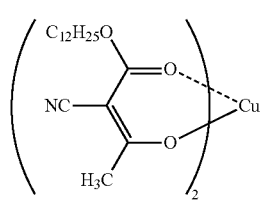
17
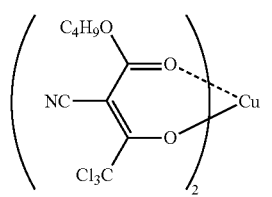
18
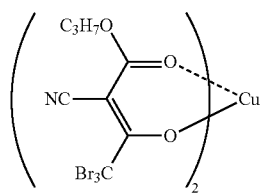
19
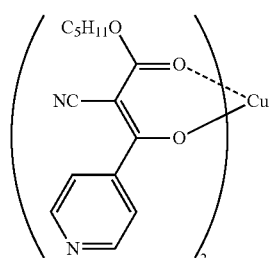
20
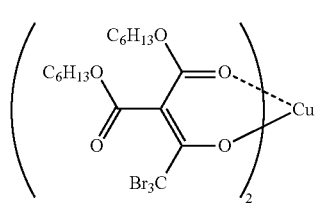
21
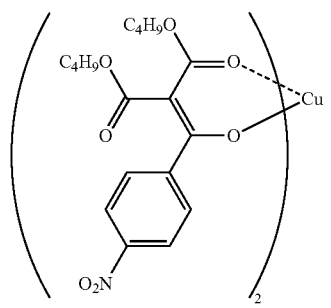
22
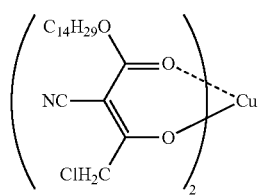
23
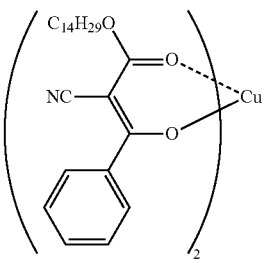
24
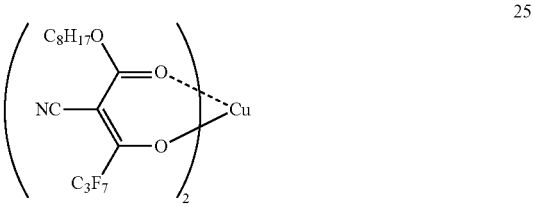
25
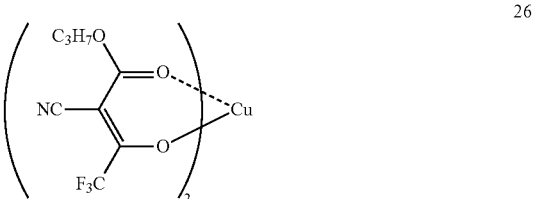
26
27
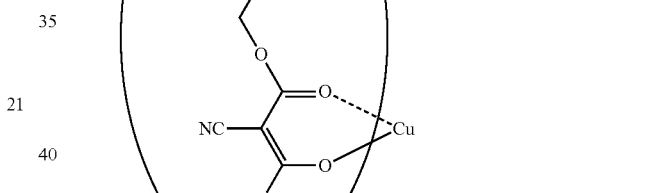
28
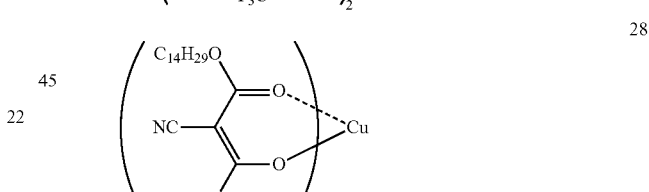
29
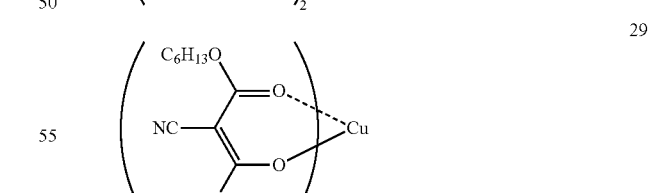
30
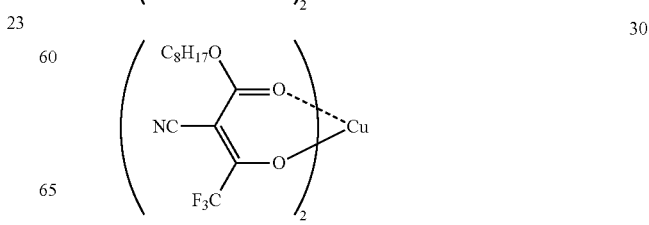

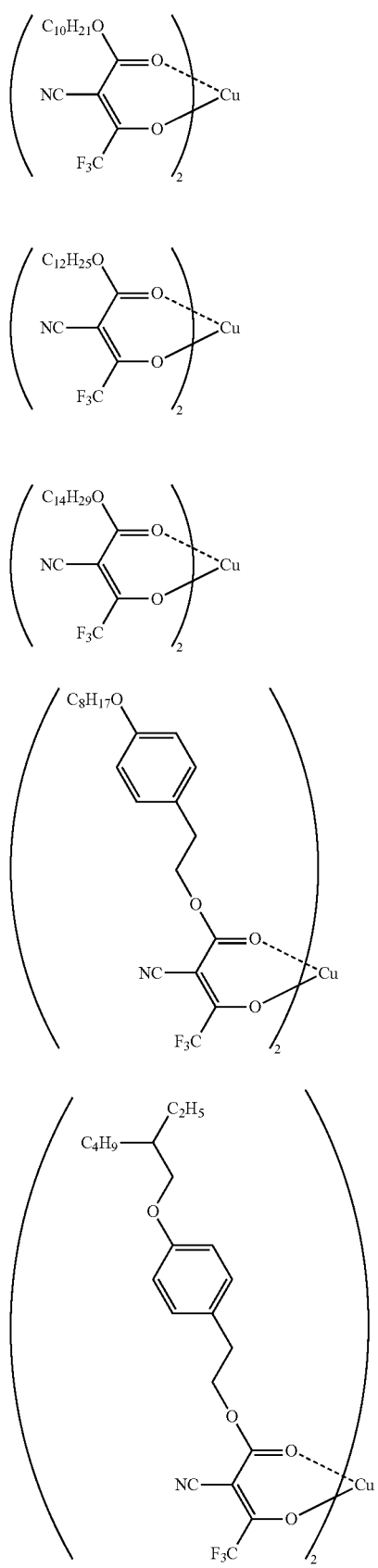
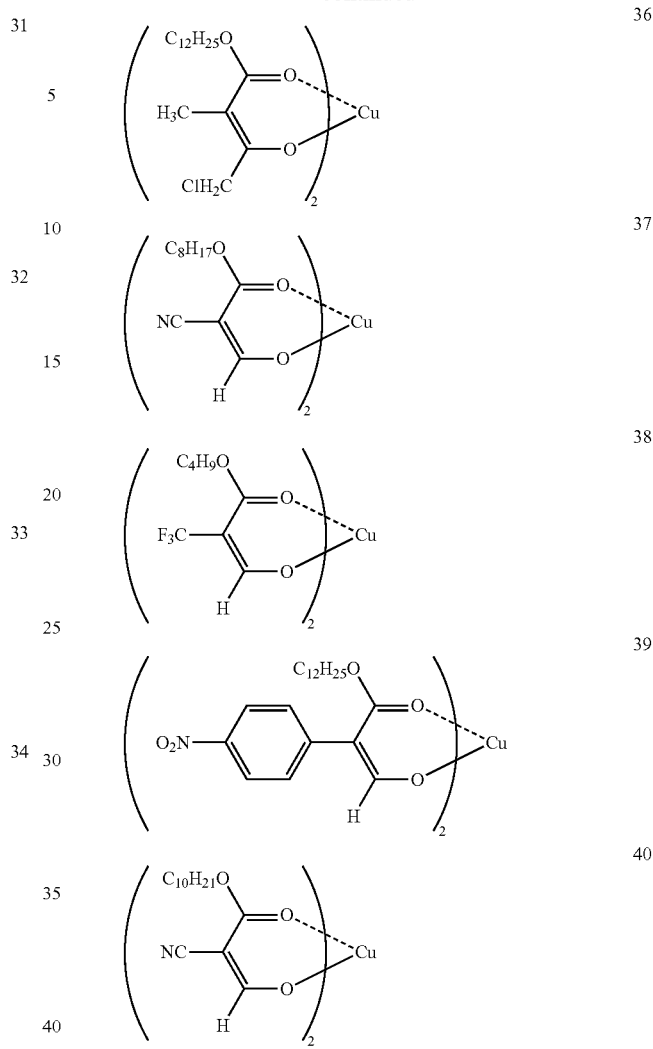

The color toner for an electrophotography according to this invention will be described.

The color toner for an electrophotography comprises a resin and the compound represented by the formula (X-1).

The compound represented by the formula (X-1) is preferably an oil soluble dye when it is employed in a toner. The oil soluble dye is usually a dye having no water soluble group such as a carbonic acid or sulphonic acid group and soluble in an organic solvent and not in water, however it includes a dye showing oil solubility by forming a salt of the water soluble dye with a long chain base in the present invention. When the compound is oil soluble, toner may prepared via various methods to incorporate the compound in a toner such that a solid dispersion of the compound is prepared via submerged drying method and is incorporated in a toner; the compound is added in a step of aggregating the emulsified polymer by a coagulant to color a toner; and the compound is added in step of polymerizing monomers and a toner is prepared by polymerization. Good transparency of a toner color as well as color of superposed toners can be obtained when the compound is sufficiently compatible to a thermoplastic resin in a toner, whereby the compound migrates in the thermoplastic resin to form a colored area, a dye cloud, having larger than the minute particle of the compound as itself.

The compound represented by the formula (X-1) may be used singly or plurality thereof having different structures may be used in an electrophotographic toner.

The compound represented by the formula (X-1) may be used in combination with a conventional dye used for the electrophotography as far as the dye does not deteriorate the characteristics of the compound represented by the formula (X-1).

(Dye Dispersion)

The toner according to this invention contains a compound represented by the formula (X-1). The compound may be incorporated in a toner as a solid dispersion in the following manners. The compound singly or in combination with a resin, which may be dispersed in water employing a dispersant such as a surfactant, is dissolved or dispersed in a water-immiscible organic solvent such as ethyl acetate or toluene, and further emulsified in water to form an emulsion; the thus formed emulsion is subjected to submerged drying to remove the organic solvent to obtain a dispersion of colored particles; and the colored particles are allowed to coagulate with a latex of a (thermoplastic) resin to obtain toner particles. Emulsification is carried out using, for example, an ultrasonic homogenizer or a high-speed stirring type disperser.

A solid particle dispersion of the metal chelate dye is comprised of microparticles, having a particle size of 10 to 2000 nm, and preferably 10 to 100 nm, more preferably 10 to 80 nm. The solid particle dispersion is preferably comprised of monodisperse microparticles, whereby light-scattering is reduced and light-masking particles are reduced. Enhanced monochromatic transparency of the toner results, leading to greatly enhanced chroma (or colorfulness) per dye coverage.

Alternatively, a solid of the compound represented by the formula (X-1) is mixed with a surfactant and pulverized by using a medium type stirrer to obtain a dispersion of colored particles. The colored particle dispersion is allowed to coagulated with a latex of (thermoplastic) resin to obtain toner particles.

A solid particle dispersion obtained by the submerged drying method is comprised of particles exhibiting a form close to a sphere, resulting in enhanced adhesiveness to a binder and reduced interfacial scattering.

The solid particle dispersion includes, as far as it contains the compound represented by the formula (X-1) as a colorant, minute particles composed of the compound represented by the formula (X-1) as itself, minute particles composed of a combination of the colorant and a surfactant, minute particles composed of a combination of the colorant, a surfactant and a resin, and further minute particles containing other additives. Colored minute particles having various characteristics can be obtained by employing a resin or an additive in addition to the dye as the colorant component in combination.

(Surfactant)

A usual anionic emulsification agent (surfactant) and/or nonionic emulsification agent (surfactant) can be used according to necessity on the occasion of emulsification of the colored fine particle as one of preferable embodiments of the invention.

As examples of nonionic surfactant, a polyoxyethylene alkyl ether such as polyoxyethylene lauryl ether and polyoxyethylene stearyl ether, a polyoxyethylene alkylphenyl ether such as polyoxyethylene nonylphenyl ether, a sorbitan higher fatty acid ester such as sorbitan monolaurate, sorbitan monostearate and sorbitan trioleate, a polyoxyethylene higher fatty acid ester such as polyoxyethylene monolaurate and polyoxyethylene monostearate, a glycerol higher fatty acid ester such as oleic monoglyceride and stearic monoglyceride and a polyoxyethylene-polyoxypropylene block copolymer are cited.

As examples of the anionic surfactant, a higher fatty acid salt such as sodium oleate, an alkylarylsulfonate such as sodium dodecylbenzenesulfonate, an alkylsulfate such as sodium laurylsulfate, a polyoxyethylene alkyl ether sulfate such as sodium polyethoxyethylene lauryl ether sulfate, polyoxyethylene alkylaryl ether sulfate such as sodium polyoxyethylene nonylphenyl ether sulfate, a salt of alkylsulfosuccinic ester salt such as sodium monooctyl-sulfosuccinate, sodium dioctylsulfosuccinate and sodium polyoxyethylene laurylsulfosuccinate and a derivative thereof can be cited.

The compound represented by the formula (X-1) included in the electrophotographic toner preferably is in the form of particles having a particle size of 10 to 100 nm. The particles are small size and monodisperse, whereby light-scattering is reduced and light-masking particles are removed.

When the compound represented by formula (X-1) is not in the state of a molecule but in the form of coagulated particles, migration is inhibited, causing no concern of sublimation of a dye during fixing or oil staining.

(Thermoplastic or Binder Resin)

As the thermoplastic resin to be contained in the electrophotographic toner of the invention, one having high contacting ability with the colored fine particle or the copper complex fine particle which are one of the preferable embodiments of the invention, and solvent-soluble one is particularly preferred. A curable resin capable of forming a three dimensional structure is usable when the precursor of the resin is solvent soluble. As the thermoplastic resin, one usually used for toner can be used without any limitation. Examples of the thermoplastic resin include a styrene type resin, an acryl resin such as an alkyl acrylate and alkyl methacrylate, a styrene-acryl type copolymer resin, a polyester type resin, a silicone type resin, an olefin type resin, an amide type resin and an epoxy type resin are suitably used, and the resin having high transparency, low viscosity in melted state and sharp melting property is required for raising the transparency and the color reproducibility of the overlapped image. Styrene type resin, acryl type resin and polyester resin are suitable for the resin having such the properties.

The resin having a number average molecular weight (Mn) of from 3,000 to 6,000, preferably from 3,500 to 5,500, a ratio Mw/Mn of weight average molecular weight Mw to number average molecular weight Mn of from 2 to 6, preferably from 2.5 to 5.5, a glass transition temperature of from 50 to 70° C., preferably from 55 to 70° C., and a softening point of from 90 to 110° C., preferably from 90 to 105° C. is desirably used for the binder resin.

Fixing strength against folding is degraded and damages of the image are caused by peeling off of the toner on the occasion of folding a full color solid image when the number average molecular weight of the binder resin is less than 3,000, and the fixing strength is lowered accompanied with lowering in the thermal melting ability on the occasion of fixing when the number average molecular weight exceeds 6,000. Offset at high temperature is easily caused when Mw/Mn is less than 2, and the sharp melt ability at the time of fixing is lowered and light permeability and color mixing ability on the occasion of full color image formation is degraded when the ratio is more than 6. When the glass transition point is lower than 50° C., the heat resistivity of the toner is made insufficient and coagulation of the toner during storage tends to be caused and when the glass transition point is higher than 70° C., the toner is difficulty melted so that the fixing ability and the color mixing ability on the occasion of full color image formation are lowered. When the softening point is lower than 90° C., high temperature offset is easily caused and when higher than 110° C., light permeability, color mixing ability and glossiness of full color image are lowered.

(Toner)

In the electrophotographic toner of the invention, a charge controlling agent and an offset preventing agent can be added additionally to the above thermoplastic resin and the colored fine particle.

As the charge controlling agent to be used in the color toner, a colorless, white or faint color charge controlling agent which does not give bad influence on the tone and transparency of the toner can be used. For example, complexes of metal such as zinc and chromium with a derivative of salicylic acid, calixarene type compounds, organic boron compounds and fluorine-containing quaternary ammonium salt type compounds are suitably can be used. For example, the salicylic acid metal complexes described in JP A S53-127726 and 62-145255, the calixarene compounds described in JP A H02-201378, the organic boron compounds described in JP A H02-221967 and the fluorine-containing quaternary ammonium salt type compounds described in 3-1162 are usable. When such the charge controlling agent is used the content of it is preferably from 0.1 to 10, and more preferably from 0.5 to 5.0, parts by weight to 100 parts by weight of the thermoplastic resin (binder resin).

The offset preventing agent is not specifically limited and polyethylene wax, oxide type polyethylene wax, Carnauba wax, polypropylene wax, oxide type polypropylene wax, Sasol wax, rice wax, candelilla wax, jojoba oil wax and beeswax are usable for example. The adding amount of such the wax is desirably from 0.5 to 5, preferably from 1 to 3, parts by weight to 100 parts by weight of the thermoplastic (binder) resin. The effect of addition is made insufficient when the adding amount is less than 0.5 parts by weight, and the transparence and color reproduction ability is lowered when the adding amount is more than 5 parts by weight.

The electrophotographic toner of the invention can be produced by using the above-described thermoplastic resin, colored fine particle and the other desirable additives, the fine particle may be a mixture of several kinds thereof or single kind for each of the particles, and by applying a method such as a knead and crushing method, suspension polymerization method, emulsion polymerization method, emulsified dispersion granule forming method, and capsulation method.

Among these production methods, the emulsion polymerization method is preferable from the viewpoint of the cost and stability of the production considering the size down of the toner particle accompanied with the improvement of image quality.

By the polymerization method, the toner particle is produced as follows; thermoplastic resin emulsion prepared by emulsion polymerization is mixed with the dispersion of another component of toner particle such as the colored fine particles and the particles are gradually coagulated while taking balance between the repulsion force of the particle surface and the coagulation force caused by the addition of electrolyte by pH control, and the fusion and shape of the particles is controlled by heating and stirring the system while controlling the diameter and distribution thereof. It is preferable from the viewpoint of high definition reproduction of image to control the volume average diameter of the electrophotographic toner particle to 4 to 10 μm, more preferably to 6 to 9 μm.

In the electrophotographic toner of the invention, a post treatment agent can be added and mixed for providing fluidity and improvement of cleaning suitability. As such the post treatment agent, an inorganic oxide fine particle such as a silica fine particle, an alumina fine particle and a titanic fine particle, an inorganic stearic acid compound such as aluminum stearate fine particle and zinc stearate fine particle and an inorganic titanic acid compound fine particle such as strontium titanate and zinc titanate are usable. Such the fine particles may be used singly or in combination with another kind of additive. It is desirable that these fine particles are subjected to surface treatment by a silane coupling agent, titanium coupling agent, higher fatty acid or silicone oil and the adding amount of the fine particle is from 0.05 to 5 parts by weight, preferably from 0.1 to 3 parts by weight, to 100 parts by weight of the toner.

The electrophotographic toner of the invention can be used as the toner of a two-component developer together with a carrier or a one-component developer without carrier.

As the carrier for two-component developer to be combined with the electrophotographic toner of the invention, for example, a carrier composed of a particle of magnetic substance such as iron and ferrite, a resin coated carrier prepared by coating the magnetic particle with a resin and a binder type carrier prepared by dispersing the fine particles of the magnetic substance into a binder resin are usable.

Among these carriers, a resin coat carrier using a silicone type resin, a copolymer resin (graft resin) of organopolysiloxane and a vinyl type monomer or a polyester type resin is preferably used from the viewpoint of toner spending and a carrier coated with a resin formed by reacting isocyanate to the copolymer resin of organopolysiloxane and a vinyl type monomer is preferable from the viewpoint of durability, environmental stability and ant-spending property. As the above vinyl type monomer, a monomer having a substituent reactive with isocyanate such as a hydroxyl group is necessarily used. The carrier having a volume average diameter of from 20 to 100 μm and preferably from 20 to 60 μm is preferably used for holding high image quality and preventing fog.

The color toner may comprise a metal-containing compound represented by Formula (1). The compound represented by Formula (1) is used in any content ratio to the compound represented by Formula (X-1) according to an object, and preferably the ratio A/B is between 0.5 and 2.5 and more preferably 0.8 and 2.0, wherein A is total mole of the compound represented by Formula (X-1) added in the toner and B is total mole of the metal-containing compound represented by Formula (1).

EXAMPLES

Example 1

Evaluation of Handling of Dye Solid Powder (I)

Solid powder of DX-1 was dried well and pulverized properly by using glass rod was reserved in a Petri dish for 24 hours in an environment of 20° C. and 55% RH.

Then about 10 g of the powder was taken on a 10 cm×10 cm paraffin paper, which was put into a 50 ml sample tube carefully. Appearance of remaining powder on the paraffin paper and scattered powder flew around was totally evaluated by visual observation. The same procedure was conducted by three persons separately, and their opinions were summarized to determine the evaluation.

The evaluation was ranked as A, B, C and D, criteria of which is described below. Ranks A and are practically acceptable. The results are shown in Table 1.

Criteria

A: Residual powder was hardly observed on paraffin paper, and powder scattered around was not observed.

B: Residual powder was hardly observed on paraffin paper, and powder scattered around was observed slightly.

C: Residual powder was observed partly on paraffin paper, and powder scattered around was observed partly.

D: Residual powder was observed adhered to both front and back surface of the paraffin paper, and powder scattered around was observed.

Evaluation of Handling of Dye Solid Powder (II)

The same test was conducted in the same way as Evaluation of Handling of Dye Solid Powder (I) except that the powder was reserved in an environment of 30° C. and 30% RH. The result is shown in Table 1.

Evaluation of Handling of Dye Solid Powder (III)

The same test was conducted in the same way as Evaluation of Handling of Dye Solid Powder (II) except that the powder was reserved for more 24 hours. The result is shown in Table 1.

The same test was conducted by changing solid powder as described in Table 1. The result is shown in Table 1.

TABLE 1

| No. | Compound | Evaluation (I) | Evaluation (II) | Evaluation (III) |
|---|---|---|---|---|
| 1-1 | DX-1 | B | B | B |
| 1-2 | DX-3 | A | A | B |
| 1-3 | DX-4 | A | B | B |
| 1-4 | DX-5 | A | A | A |
| 1-5 | DX-7 | A | B | B |
| 1-6 | DX-9 | A | B | B |
| 1-7 | DX-10 | A | B | B |
| 1-8 | DX-11 | A | A | B |
| 1-9 | DX-12 | A | A | A |
| 1-10 | DX-17 | B | B | B |
| 1-11 | DX-18 | B | B | B |
| 1-12 | DX-23 | B | B | B |
| 1-13 | Dye A | B | C | C |
| 1-14 | Dye B | B | C | D |

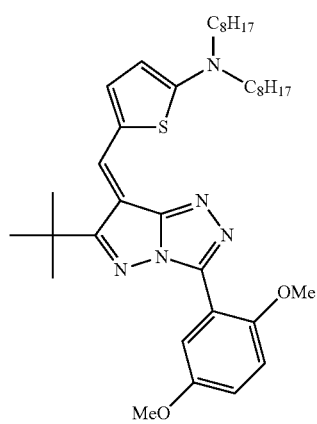

Dye A (Disclosed in JP A 2007-34264)

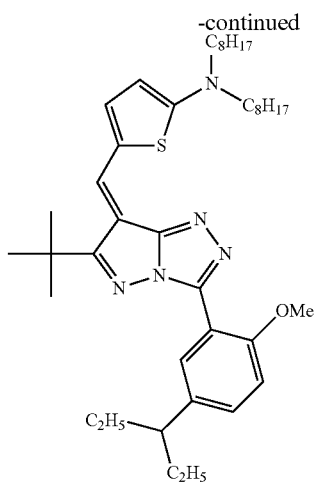

Dye B (Disclosed in JP A 2006-350300)

Example 2

Evaluation of Stability of Dye Solid Powder Dispersed in Water

<Preparation of Dispersion 2-1>

Each of 20 g of compounds shown in Table 2, was added in a solution of 9.5 g of sodium dodecyl sulfate dissolved in 200 ml of deionized water, the mixture was subjected to stirring and ultrasonic dispersion. Dispersion process was terminated when volume average particle diameter (diameter of particle at which particles are accumulated to 50% from smaller diameter) reached about 0.4 μm, and aqueous dispersion was prepared Ultrasonic dispersion apparatus: UH-600S manufactured by SMT Co., Ltd.

Particle diameter Distribution analyzer: MICROTRACK MT3300EXII manufactured by Nikkiso Co., Ltd Evaluation of Stability of Dispersion The aqueous dispersion was kept stand and period maintaining stable dispersion state was measured.

Three dispersion were prepared for each dye solid powder and average time maintaining stable dispersion state was obtained as the index of the stability. Ranks A and B are practically good stability.

The result is shown in Table 2.

Criteria

A: Stable for 15 minutes or more.
B: Stable for 10 minutes to less than 15 minutes.
C: Stable for 5 minutes to less than 10 minutes.
D: Stable for less than 5 minutes.

TABLE 2

| No. | (X-1) Compound | Evaluation |
|---|---|---|
| 2-1 | DX-1 | B |
| 2-2 | DX-3 | A |
| 2-3 | DX-4 | B |
| 2-4 | DX-5 | A |
| 2-5 | DX-7 | B |
| 2-6 | DX-9 | B |
| 2-7 | DX-10 | B |
| 2-8 | DX-11 | A |
| 2-9 | DX-12 | B |

TABLE 2-continued

| No. | (X-1) Compound | Evaluation |
|---|---|---|
| 2-10 | DX-17 | B |
| 2-11 | DX-18 | B |
| 2-12 | DX-23 | B |
| 2-13 | Dye A | D |
| 2-14 | Dye B | D |

The result shown in Table 2 demonstrates the compounds according to the present invention are excellent in dispersion stability in comparison with Dyes A and B.

Example 3

Preparation of Toner

Toners were prepared by employing compounds shown in Table 3 and preparation method described below.
<Preparation Method 1, Pulverization Method>
One hundred parts by weight of polyester resin, 2 parts by weight of colorant and the equimolar copper complex compound each shown in Table 1 and 3 parts by weight of propylene resin VISCOL 550P, manufactured by Sanyo Chemical Industries, Ltd., were mixed, kneaded, pulverized and classified to obtain a powder having an average particle diameter of 8.5 μm. Then 100 parts by weight of the powder and 1.0 parts of silica fine particles 8805 having a particle diameter of 12 nm and a hydrophobicity of 60, manufactured by Nippon Aerosil Co., Ltd., was mixed by a Henschel mixer to obtain a crushed toner.
<Preparation Method of Crushed Color Toner>
A solid dye powder according to this invention in an amount of 20 g and a metal-containing compound (amount disclosed in Table 3) were added to a solution of 45 g of sodium dodecyl sulfate dissolved in 200 ml of deionized water, the mixture was subjected to stirring and ultrasonic dispersion to obtain colorant dispersion. Emulsion dispersion was prepared by that low molecular weigh polypropylene having number average molecular weight of 3,200 was added to it with heating and emulsified in water so that the solid content became 30% by weight.

To the emulsion dispersion 60 g of low molecular weight polypropylene emulsion dispersion was mixed and then 220 g of styrene, 40 g of n-butylacrylate, 12 g of methacrylic acid, 5.4 g' of t-dodecylmercaptane as a chain-transfer agent and 2,000 ml of degassed deionized water were added. The emulsion polymerization was conducted by stirring in nitrogen stream at 70° C. for 3 hours.

To 1,000 ml of obtained resin fine particle dispersion aqueous solution of sodium chloride was added to adjust pH of 7.0, 270 ml of 2.7 mol % aqueous solution of potassium chloride was added and further solution of 160 ml of isopropyl alcohol and 9.0 g of polyoxyethylene-octylphenylether having ethyleneoxide average polymerization degree of 10, dissolved in 60 ml of deionized water, was added. The mixture was subjected to reaction with stirring at 75° C. for 6 hours. The obtained reaction product was filtered and washed, and dried and pulverized to obtain colored particles.

The colored particles and 1.0 parts of silica fine particles R805, having particle diameter of 12 nm, hydrophobicity of 60, manufactured by Nihon Aerosil, were mixed by Henschel mixer to obtain polymerization method toner.

Production suitability was evaluated in view of processing adaptability by 5 times production of toners in each production method. Rank A is suitable.

Criteria
(Production Method 1)
A: Color stain was not observed at production area during weighing and mixing.
B: Color stain was observed t production area by scattering solid powder during weighing and mixing.
(Production Method 1)
A: Color stain was not observed at production area during weighing and preparation of emulsion dispersion was easy.
B: Scattering of solid powder was observed and speedy handling was required prior to generation of precipitation of dispersion.

TABLE 3

| No. | (X-1) Compound | Compound represented by Formula (1) Compound | Amount | Preparation method | Evaluation |
|---|---|---|---|---|---|
| 3-1 | DX-1 | — | — | 1 | A |
| 3-2 | DX-1 | 32 | Equimolar to DX-1 | 1 | A |
| 3-3 | DX-5 | — | — | 2 | A |
| 3-4 | DX-5 | 32 | Equimolar to DX-5 | 2 | A |
| 3-5 | DX-7 | — | — | 1 | A |
| 3-6 | DX-7 | 32 | Equimolar to DX-7 | 1 | A |
| 3-7 | DX-9 | — | — | 1 | A |
| 3-8 | DX-9 | 32 | Equimolar to DX-9 | 1 | A |
| 3-9 | DX-12 | — | — | 2 | A |
| 3-10 | DX-12 | 32 | Equimolar to DX-12 | 2 | A |
| 3-11 | Dye A | — | — | 1 | B |
| 3-12 | Dye A | 32 | Equimolar to Dye A | 1 | B |
| 3-13 | Dye B | — | — | 2 | B |
| 3-14 | Dye B | 32 | Equimolar to Dye B | 2 | B |

The result demonstrates that the compounds of this invention are good in handling in any preparation methods, less scattering and reduced environmental contamination.

The invention claimed is:
1. A compound represented by Formula (X-1),

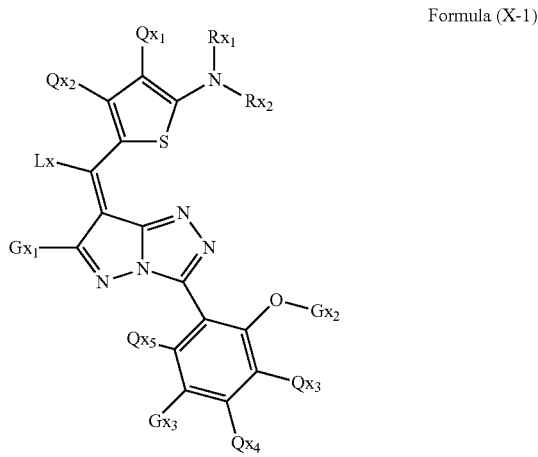

Formula (X-1)

in the formula x-1, $Rx_1$ and $Rx_2$ each independently represents an alkyl group, Lx is a hydrogen atom or an alkyl group, $Gx_1$ is an alkyl group having 2 or more carbon atoms, $Gx_2$ is an alkyl group or an aromatic hydrocarbon group, $Gx_3$ is a hydrogen atom, and $Qx_1$, $Qx_2$, $Qx_3$, $Qx_4$ and $Qx_5$ each independently represents a hydrogen atom or a substituent.

2. The compound of claim 1, wherein $Gx_1$ is a branched alkyl group.

3. The compound of claim 1, wherein Lx is a hydrogen atom.

4. The compound of claim 1, wherein $Gx_1$ is a tertiary alkyl group.

5. The compound of claim 1, wherein $Qx_1$, $Qx_2$, $Qx_3$, $Qx_4$ and $Qx_5$ each represents a hydrogen atom.

6. A color toner for an electrophotography comprising a resin and a compound represented by formula (X-1) of claim 1,

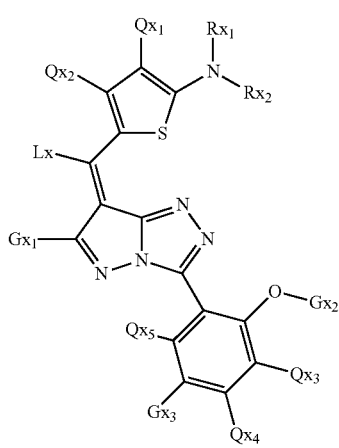

Formula (X-1)

in the formula, $Rx_1$ and $Rx_2$ each independently represents an alkyl group, Lx is a hydrogen atom or an alkyl group, $Gx_1$ is an alkyl group having 2 or more carbon atoms, $Gx_2$ is an alkyl group or an aromatic hydrocarbon group, $Gx_3$ is a hydrogen atom, and $Qx_1$, $Qx_2$, $Qx_3$, $Qx_4$ and $Qx_5$ each independently represents a hydrogen atom or a substituent.

7. The color toner for an electrophotography of claim 6, which further comprises a compound represented by Formula (1),

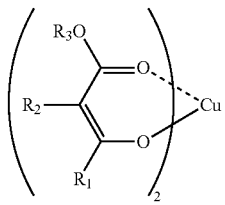

Formula (1)

in the Formula (1), $R_1$ is a hydrogen atom or a substituent, $R_2$ is an alky group, an alkenyl group, an alkynyl group, an aryl group, a heterocyclic group, an alkoxycarbonyl group, an aryloxcarbonyl group, a sulfamoyl group, a sulfinyl group, an alkylsulfonyl group, an arylsulfonyl group or a cyano group, in which at least one of $R_1$ and $R_2$ is an electron attractive group, and $R_3$ is an alky group having 3 or more carbon atoms, an alkenyl group, an alkynyl group, an aryl group or a heterocyclic group, with proviso that number of carbon atoms in one molecule of the ligand represented by formula (1) is 25 or less.

8. The color toner for an electrophotography of claim 7, wherein $R_1$ is an alky group, an alkenyl group, an aryl group, a heterocyclic group, an alkoxycarbonyl group, an acyl group, a carbamoyl group or a cyano group.

9. The color toner for an electrophotography of claim 8, wherein $R_1$ is an alky group, an aryl group, a heterocyclic group or a cyano group.

10. The color toner for an electrophotography of claim 9, wherein $R_1$ is a trifluoromethyl group or a trichloromethyl group.

11. The color toner for an electrophotography of claim 7, wherein $R_2$ is an alky group, a cyano group, a sulfinyl group, or sulfonyl group.

12. The color toner for an electrophotography of claim 11, wherein $R_2$ is a cyano group, a sulfinyl group or a sulfonyl group.

13. The color toner for an electrophotography of claim 7, wherein $R_3$ is an alky group having 3 or more carbon atoms, an alkenyl group, an alkynyl group, an aryl group or a heterocyclic group.

14. The color toner for an electrophotography of claim 13, wherein $R_3$ is an alky group having 8 or more carbon atoms.

* * * * *